United States Patent [19]

Kennedy

[11] Patent Number: 5,127,167
[45] Date of Patent: Jul. 7, 1992

[54] MULTI-FUNCTION SPIRIT-LEVEL

[76] Inventor: Donald F. Kennedy, 562 Rimini Rd., Del Mar, Calif. 92014

[21] Appl. No.: 741,634

[22] Filed: Aug. 7, 1991

[51] Int. Cl.$^5$ .............................. G01B 9/28; G01B 9/34
[52] U.S. Cl. ........................................ 33/370; 33/379; 33/388; 33/390
[58] Field of Search ................. 33/369, 379, 380, 385, 33/388, 390

[56] References Cited

U.S. PATENT DOCUMENTS

| | | | |
|---|---|---|---|
| 1,101,319 | 6/1914 | Neff | 33/385 |
| 1,127,809 | 2/1915 | Richardson | 33/388 |
| 1,657,546 | 1/1928 | Patton | 33/388 |
| 2,097,849 | 11/1937 | Torbert, Jr. | 33/388 |
| 2,263,163 | 11/1941 | Cornell | 33/384 |
| 2,373,641 | 4/1945 | Ackerson | 33/385 |
| 3,009,250 | 11/1961 | Schock | 33/388 |
| 3,138,878 | 6/1964 | Mehlman | 33/379 |
| 4,545,129 | 10/1985 | Stone | 33/390 |
| 4,653,193 | 3/1987 | Kennedy et al. | 33/379 |
| 4,999,921 | 3/1991 | Bird et al. | 33/385 |

FOREIGN PATENT DOCUMENTS 0238667 8/1986 German Democratic Rep. ... 33/377

*Primary Examiner*—Thomas B. Will
*Attorney, Agent, or Firm*—Frank D. Gilliam

[57] ABSTRACT

A multi-function spirit-level adapted for use as inclination indicators for different specific slopes comprising a central conventional spirit level bubble tube attached at each distal end to a rectangular member with no support or other structure therebetween. The rectangular members are positioned normal to the central bubble tube. One of the rectangular members has a greater surface area than the other. The rectangular members are positioned at the ends of the bubble tube so that their four narrow outer surfaces are parallel. The bubble tube is centered on one of the rectangle members and positioned off center on the other. The offset position of one end of the bubble tube allows the spirit level to measure four different slope angles by resting the rectangular members on each of their four different outer parallel surfaces. Visible indica on the top of at least one of the rectangular members indicates the discrete slope angle of each of the pair of parallel surfaces when those surfaces are resting on an item whose slant angle is to be measured is expected to be an opposite and equal slanting indication angle. The bubble tube has at least a pair of spaced apart markers between which the bubble is positioned when one of the selected discrete slope angles is achieved. When the slope angle is not exact user interpretation or other bubble tube indicators determines the approximate slope angle of the surface that is being slope angle checked. A shirt pocket clip is attached to one exterior surface of one of the rectangular members for removable attachment to the users pocket for ease of transport.

10 Claims, 2 Drawing Sheets

MULTI-FUNCTION SPIRIT-LEVEL

BACKGROUND OF THE INVENTION

The invention is directed to a spirit level having a bubble tube containing a liquid with an air bubble therein used by tradesman and the like for checking slope angles of drainage pipe or the like and is an advancement over the polyfunctional spirit level covered in U.S. Pat. No. 4,653,193 which I am a co-inventor.

Various attempts have been made in the past to develop carpentry levels and the like that can be used to check alignment surfaces relative to one another and also determine the angle, that certain surfaces are disposed with respect to the horizontal and/or vertical plane.

Some of the prior art devices that have been developed comprise nothing more than elongated rigid tools having a plurality of bubble elements and other angular indicating means associated therewith.

Other prior art devices employ a spirit level that is latterly or vertically translatable along a flat edge support member.

Still other prior art devices employ a spirit body level devices, wherein the levels sections are pivotally secured to one another.

Yet other spirit-level devices include one or more magnets or magnetic tape for attaching the spirit levels to ferro metal objects during use and storage.

Examples of some of the aforementioned prior art devices can be found in the following U.S. Pat. Nos. 2,398,851; 2,419,451; 2,879,606; 3,435,533; 3,820,249; 4,419,833 and 4,607,437.

While all of the above cited references are adequate for their intended purpose, they leave a lot to be desired from the standpoint of being an all around multi-purpose tradesman level. In particular, these devices are generally large in size and therefore are awkward to carry on the person and are not capable of reading a plurality of different slope angles.

U.S. Pat. No. 4,653,193 of which I am a co-inventor teaches a spirit level adapted for use as an declination monitor for two different angles of declination that has found wide acceptance in the building trades. My present invention provides an advancement over that level in that it will read an additional angle of declination and yet smaller in size for easy transport.

Obviously, a level that is small in physical size that can be used to measure a plurality of discrete angles of declination and can be used to approximate those angles of declination falling between certain predetermined discrete slope angles would find immediate success especially in the building trades where a plurality of certain discrete declination angle measurements are required.

SUMMARY OF THE INVENTION

The above shortcomings and others are resolved by the present invention. The present invention includes generally a spirit level comprising only a bubble tube containing a liquid with an air bubble therein positioned between a pair of transversely positioned rectangular end surfaces. The opposed outer edge surfaces of the two rectangular end surfaces are parallel to each other thereby providing a plurality of resting or support surfaces for the spirit level of the invention. The cross-sectional area of one of the end surfaces is depicted as being larger than the other. The bubble tube is longitudinally centered at the center of one of the end surfaces, generally the smaller end surface, and positioned longitudinally off center on the other or larger end surface. The off center location of one end of the bubble tube on the rectangular end surface is calculated so that when the device rests on the outer surfaces of the rectangular members the bubble tube will be at a selected declination angle opposite to the angle of declination or flow of the surface to be checked. If the desired angle of declination or flow is not equal to the angle of inclination of the bubble tube the air bubble will be positioned off center indicating less or greater than expected slope angle. The center portion of the bubble tube includes lines around the circumference of the bubble tube to indicate the degree of slope difference from the slope angle of the bubble tube.

The end viewable surface of at least on of the rectangular end surfaces will include indicia thereon to indicate the slope angle of the bottom resting position of the spirit level of the invention.

An object of this invention is to provide a multi-slope angle indicating spirit level.

Another object of this invention is to provide a multi-slope angle indicating spirit level which is small enough to carry in a shirt pocket or the like.

Yet another object of this invention is to provide a multi-slope angle indicating spirit level which is inexpensive to produce do to only requiring the end walls and bubble tube with no additional support of protective structure and suitable for use in the many building trades and especially usable in the plumbing art where the slant or liquid flow angles of sewage drain pipes and the like are critical.

All of the foregoing and still further objects and advantages of the invention will become apparent from a study of the following specification, taken in conjunction with the accompanying drawings wherein like characters of reference designate corresponding parts throughout the several views, and wherein:

BRIEF DESCRIPTION OF THE DRAWING FIGURES

DETAILED DESCRIPTION OF THE PREFERRED EMBODIMENT

Figure 1:
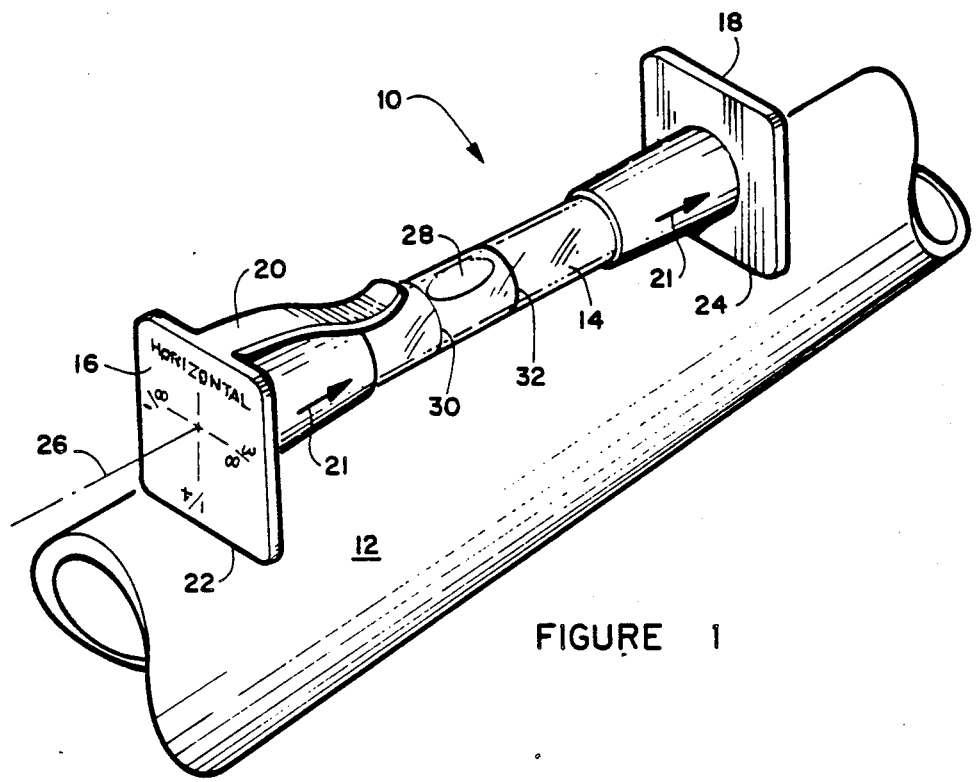
FIG. 1 is an elevated perspective showing of the spirit-level of the invention resting on a pipe with an expected horizontal slope.
Figure 2:
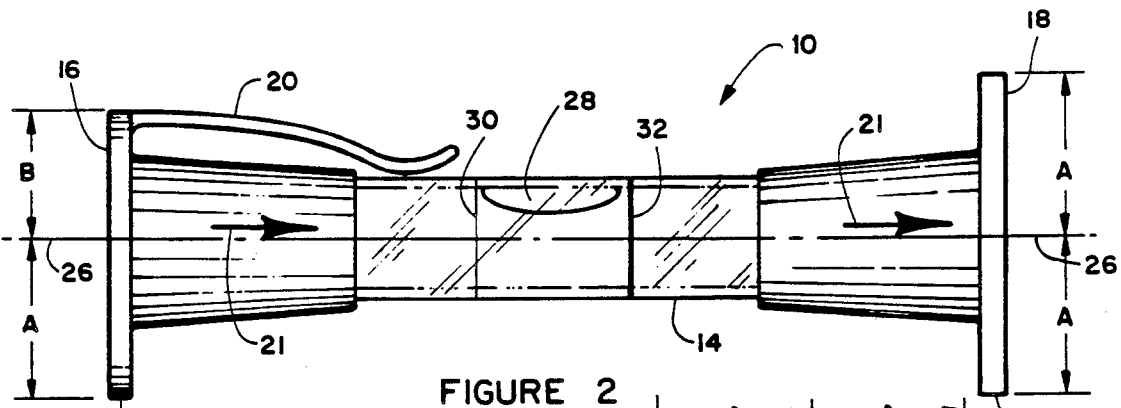
FIG. 2 is a side view showing of the spirit level of the invention.
Figure 1A:
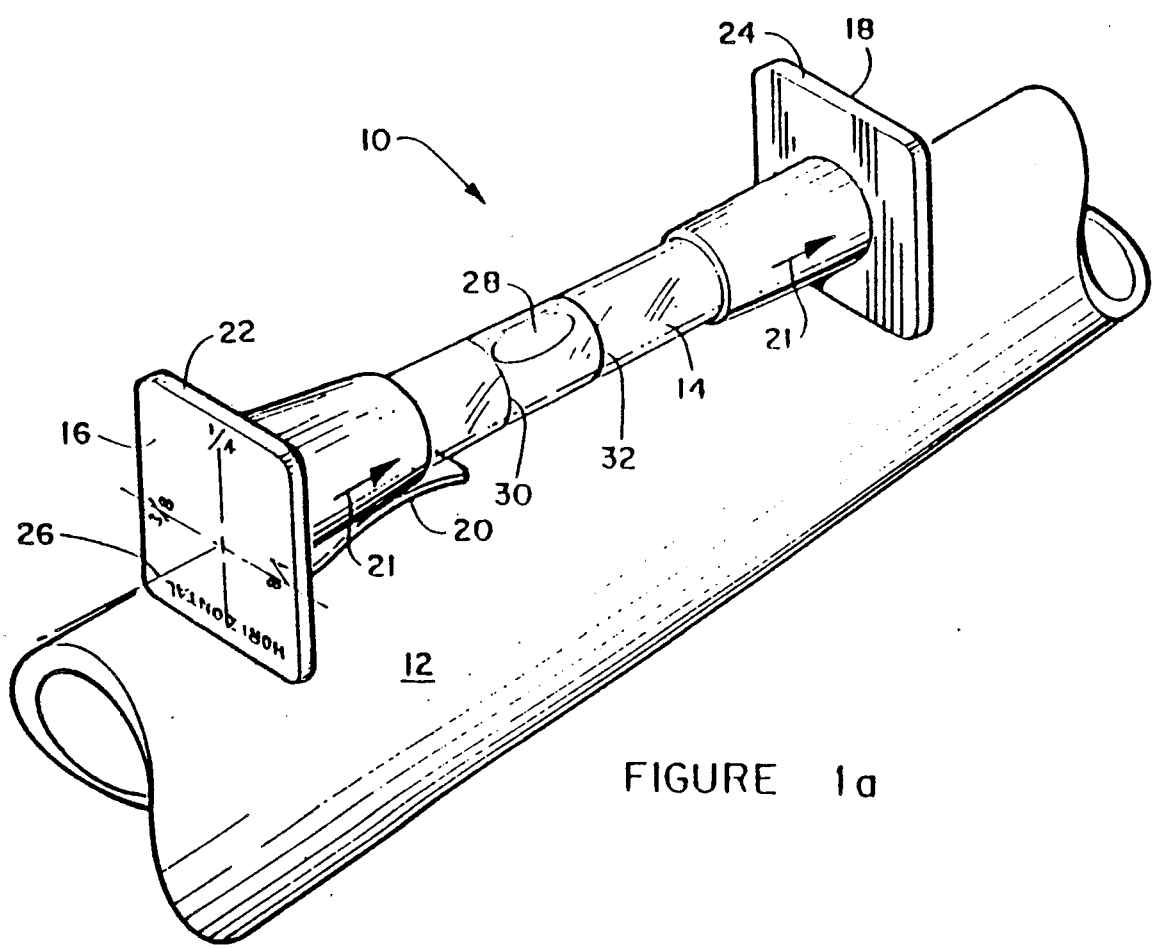
FIG. 1a is an elevated showing of the spirit level of the invention resting on a pipe with an expected ¼ or 2% slope.

Referring now to drawing FIGS. 1, 1a and 2 which show the spirit level 10 of the invention. FIG. I depicts the level 10 resting on a specimen 12, as for example a section of pipe or conduit, whose expected slant angle is to be tested for accuracy. A central bubble tube 14 is supported between a pair of rectangular end members 16 and 18 respectfully. End member 16 is shown slightly smaller in surface area than end member 18. It should, however, be understood that the end member 18 can have the same surface area or end member 16 could be larger than end member 18 to practice this invention.

A pocket clip 20 is attached to an outer surface of end member 16 and is used in a conventional manner to clip the spirit level of the invention over the outer edge of a shirt pocket or the like of the user thereof.

As can be seen in FIG. 2, the bottom surface 22 of end member 16 and the bottom surface 24 of end member 18 are on the same elevational plane, ie. both surfaces 22 and 24 are a distance "A" from the longitudinal center line 26 of the bubble tube 14. Therefore when the spirit level 10 is in the position shown with surfaces 22 and 24 in contact with an object 12 which has a slant angle expected to be horizontal is being checked the air bubble 28 will be positioned in the center of the bubble tube between indicator lines 30 and 32 when the object being checked is in fact horizontal as expected. If the object being checked is at a slant or flow angle from the horizontal the bubble will fall outside one of the lines 30 or 32 depending on the angle of the slant or flow angle from true expected horizontal.

Referring now to drawing FIG. 1a, which depicts the pipe or conduit having an expected slant angle of ¼" or 2% from the horizontal. With the spirit level 10 positioned as shown with the arrows 21 in the direction of declination or flow, the spirit level indicates that the exact expected slope angle is as expected, ie. the bubble is in the center of the level between the two indicator lines indicating a ¼ or 2% declination or flow angle. If the slant angle is more or less than that expected and shown at the top of the level side 16, the bubble will move onto one of the lines indicating either more or less of an angle than the expected angle. If the expected slope is less than ¼" or 2% the bubble will move toward the line 32.

Figure 3:
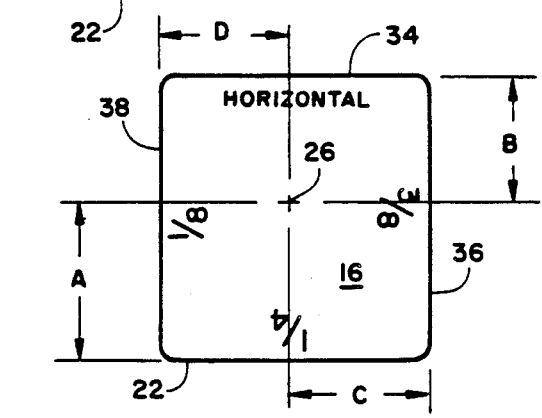
FIG. 3 is a showing of one end surface of the spirit level of the invention.
Figure 4:
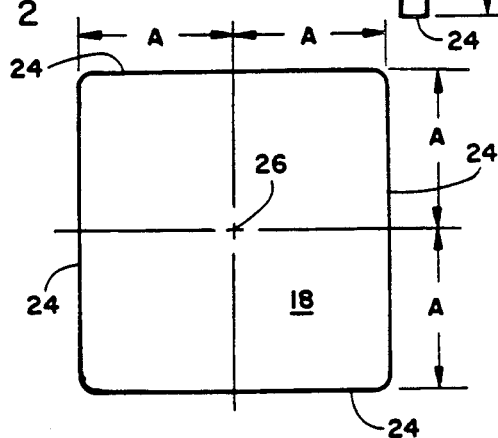
FIG. 4 is a showing of the opposite end of the spirit level of the invention from the end shown in FIG. 3.

Referring now specifically to drawing FIGS. 3 and 4, as can be seen in FIG. 4, the end of the bubble tube has its longitudinal center line 26 in the true center of the end member 18 providing a distance "A" from the center line 26 of the tube to any of the outer surfaces of the rectangular member 18.

Referring now specifically to drawing FIG. 3, as seen in FIG. 3, surface 34 is a distance "B" from bubble tube center line 26, surface 36 is a distance "C" from the bubble tube center line 26 and surface 38 is a distance "D" from the bubble tube center line 26. It should be obvious that when the spirit level 10 is placed on an object with a known expected slant or flow angle to be checked with the expected slope angle indicated at the top of the surface of end member 16 and the arrow 21 are directed along the flow direction the air bubble will be at the center of the bubble tube between indicator lines 30 and 32 if the expected slant angle of the object is present.

For example, if the spirit level rests on rectangular end member surfaces 22 a horizontal or no slant will be indicated, resting on surface 34 and 24 a 2% downward slant between 16 and 18 can be checked, resting on surface 36 and 24 a 1% downward slant between 16 and 18 can be checked and resting on surface 38 and 24 a 3% downward slant between 16 and 18 can be checked. It should be understood that the above specific slant angles established as 1-3% are an arbitrary degrees of slant used for ease of explanation and that any different degree or degrees of slant can be established between the surfaces of the end members 16 and 18 by merely shifting the center line of the bubble tube on either end 16 or 18, changing the relative size of the ends 16 and 18, changing the surface areas of ends 16 and 18 or any other means for providing a built-in known % of slant to the bubble tube between the ends 16 and 18.

The spirit level of the invention is generally used to insure that actual slope angle of the specimen 12 is at least at a pre-selected angle. If the slope angle of the specimen is less than the pre-selected angle as read by the level by its proper positioning on the specimen, the bubble will go beyond the line 32. The line 32 can be a bright color as for example, red, for easy detection of a slope of the specimen which is less than the desired slope.

It should be further understood that for slant angles substantially half way between the designated slant angles established by the location of the bubble tube the bubble 28 can be centered on either lines 30 or 32 depending on whether the slant angle of the object 12 being checked is respectfully less or more than the device indicated slant angle.

Having thereby described the subject matter of this invention it should be obvious of that many substitutions, modifications and variations of the invention are possible in light of the above teachings. It is therefore to be understood that within the scope of the appended Claims the invention may be practiced otherwise than as specifically described.

What is claimed is:

1. A small workman pocketable slant angle indicating spirit-level comprising:

a pair of end members having at least two opposed cooperating outer distal spirit level supporting surfaces, said supporting surfaces are formed around the outer edges of said end members each of said opposed outer distal spirit level supporting surfaces being parallel to each other forming a discrete support which in turn coincide with different slant angles;

a bubble tube containing liquid with an air bubble therein having a center air bubble indica means positioned along and around said bubble tube for positioning the air bubble to indicate that said bubble tube is in a substantially true horizontal position;

said bubble tube is fixedly positioned between said pair of end members so that the bubble tube is slanted in as many different slant angles as there are opposed cooperating outer distal spirit-level supporting surfaces.

2. The invention as defined in claim 1 wherein there are four opposed cooperating outer distal spirit-level supporting surfaces.

3. The invention as defined in claim 1 wherein four different slant angles can be established by said spirit-level.

4. The invention as defined in claim 1 wherein one of said end members has a larger surface area then the other end member.

5. The invention as defined in claim 1 additionally comprises a means for indicating a slang angle position of said bubble tube other than true horizontal.

6. The invention as defined in claim 1 additionally comprises a means for attaching the spirit-level to the cloths of a user.

7. The invention as defined in claim 1 additionally comprising indica indicative of the slant angle of the bubble tube when positioned on different ones of said opposed outer distal spirit-level supporting surfaces.

8. The invention as defined in claim 1 additionally comprising an indicator for indicating a direction of placement on an object in the direction of flow through that object.

9. The invention as defined in claim 1 further comprising an indicator means for indicating an angle of an object having an expected slope angle on which the device is positioned when that expected slope angle is less than the expected slope angle of that object.

10. The invention as defined in claim 9 wherein the indicating means is a brightly colored line around the circumference of said bubble tube.

* * * * *